LOGIC DEVICE

Filed Dec. 23, 1959 8 Sheets-Sheet 1

Inventors
Claude Chemla
Claude Manus
Marcel Etter
By Michael S. Striker
Attorney

LOGIC DEVICE

Filed Dec. 23, 1959 8 Sheets-Sheet 2

Inventors
Claude Chemla
Claude Manus
Marcel Etter
BY Michael S. Striker
Attorney

INVENTORS
CLAUDE CHEMLA
CLAUDE MANUS
MARCEL ETTER

BY

Michael J. Striker
ATTORNEY

Inventors
Claude Chemla
Claude Manus
Marcel Etter
BY Michael S. Striker
attorney

LOGIC DEVICE

Filed Dec. 23, 1959 8 Sheets-Sheet 5

Inventors
Claude Chemla
Claude Manus
Marcel Etter
By Michael S. Striker
attorney Inventors
Claude Chemla
Claude Manus
Marcel Etter
By Michael S. Striker
Attorney Inventors
Claude Chemla
Claude Manus.
Marcel Etter
By Michael S. Striker
Attorney Inventors
Claude Chemla
Claude Manus
Marcel Etter
BY
Michael S. Striker
Attorney

United States Patent Office 3,204,111

Patented Aug. 31, 1965

3,204,111

LOGIC DEVICE

Claude Chemla, Saint-Cloud, and Claude Manus, Gif-sur-Yvette, France, and Marcel Etter, Carouge, Geneva, Switzerland, assignors to Normacem, Paris, France, a company of France Filed Dec. 23, 1959, Ser. No. 861,632

Claims priority, application France, Dec. 29, 1958, 783,037

20 Claims. (Cl. 307—88)

The present invention is concerned with a logical computer for the evaluation of complex functions which comprises at least one bistable device or element having at least two inputs and being capable of being caused, by application of electric energy, to change between two distinct stable states.

In data transmitting technique, and particularly in the technique of automatic control based on a predetermined programme, there are frequently used so-called logical circuits which permit evaluation of logical functions. As is known, logical functions may basically be of one of two types, namely, an "and" function or an "or" function. The same is true of logical circuits.

An "and" logical circuit is one which provides for evaluation of an "and" function, In other words, in order that a signal may appear at the output of such a circuit signals of the same form must be applied to each of the circuit inputs. The absence of a signal at any one of the inputs leads to the absence of any signal at the output. Such a logical circuit is sometimes called a coincidence circuit.

An "or" logical circuit is one which provides for evaluation of an "or" function. In such a circuit, it is sufficient that a signal be applied to any one of its inputs in order that a signal of the same form may appear at the output. Such circuits are sometimes called mixer circuits.

There is also a third kind of logical function known as a complementary function, or a "not" function. The "not" logical circuit (inverter) allows a signal to appear at its output in the absence of an input signal and vice versa. The logical devices known to-day (also called logical circuit elements) allow only fairly simple logical functions to be evaluated. When more complex logical functions, known as multi-functions, have to be evaluated, it is necessary to provide a combination of the basic elements which generally leads to the provision of a large number of the latter and, consequently, to a very high cost. That, of course, is an important disadvantage of the known devices.

The invention aims at eliminating that disadvantage by providing a basic logical device which allows a large variety of complex logical functions to be evaluated because of the very general form of the logical expression which characterises it.

The logical device on computer in accordance with the invention is characterised by the fact that each of the inputs of the said bistable element is connected to the output of a logical circuit of the "and" or of the "or" type, each of the inputs of which is connected to the output of a logical circuit of the other of the two types, the inputs of the latter circuit constituting the inputs of the device of which the output is constituted by the output of the said bistable element, the arrangement as a whole being such that flipping of the bistable element is brought about by the existence of an electrical signal at one of its two inputs and the absence of a signal at the other of its two outputs, the said presence and absence of signals being simultaneous.

The invention is also concerned with a process of manufacturing the above-mentioned logical device. This process is characterised by the fact that there is prepared a printed matrix having on one of its faces a certain number of columns for connecting the inputs of the device and of the bistable element to the respective logical circuits, the columns provided to supply the inputs of the bistable element being connected through a resistor to a line provided on the other face of the matrix and serving to connect them to a source of current while, on said other one of its faces, the matrix has a certain number of lines serving to inter-connect the logical circuits, each of these lines being connected to a resistor serving to connect it to a source of current, this being achieved by the disposition on the thus printed matrix of elements serving to form the said logical circuits necessary for the evaluation of the multi-function in question in such a way that each of these elements is connected to a line and to a corresponding column and by the connection of the columns corresponding to the inputs of the element in question so as to form a standard assembly.

The attached drawing shows diagrammatically and by way of example some forms of the invention.

Figure 4:
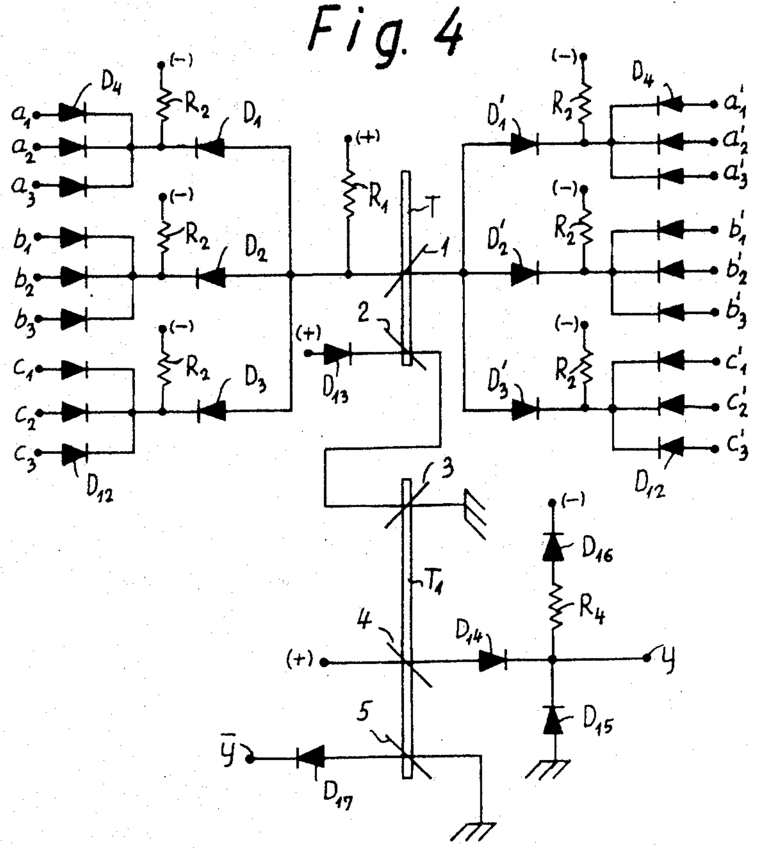
Figure 4A:
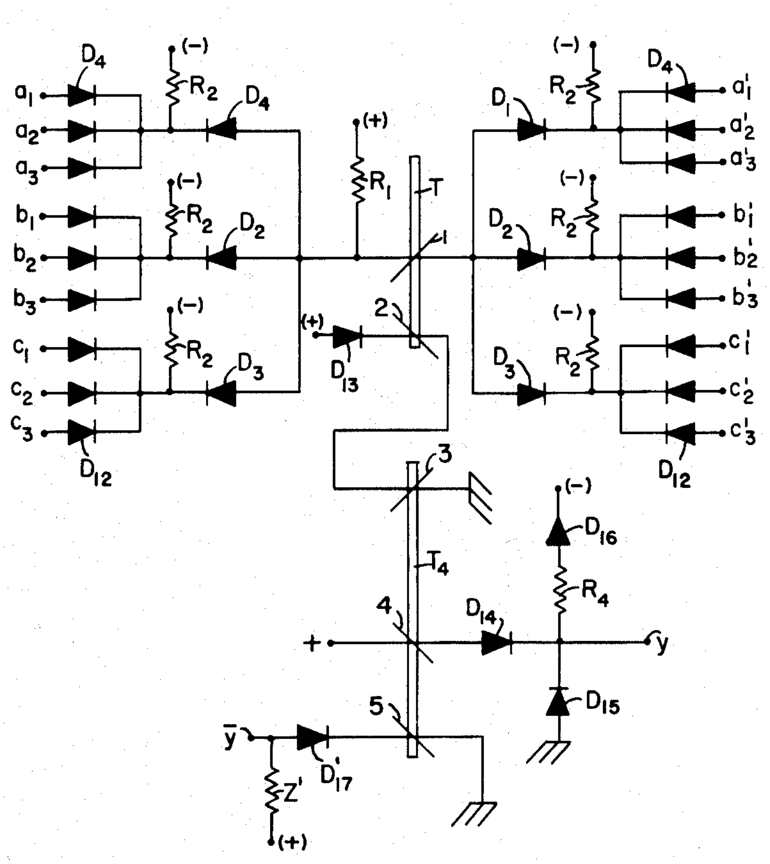
Figure 10:
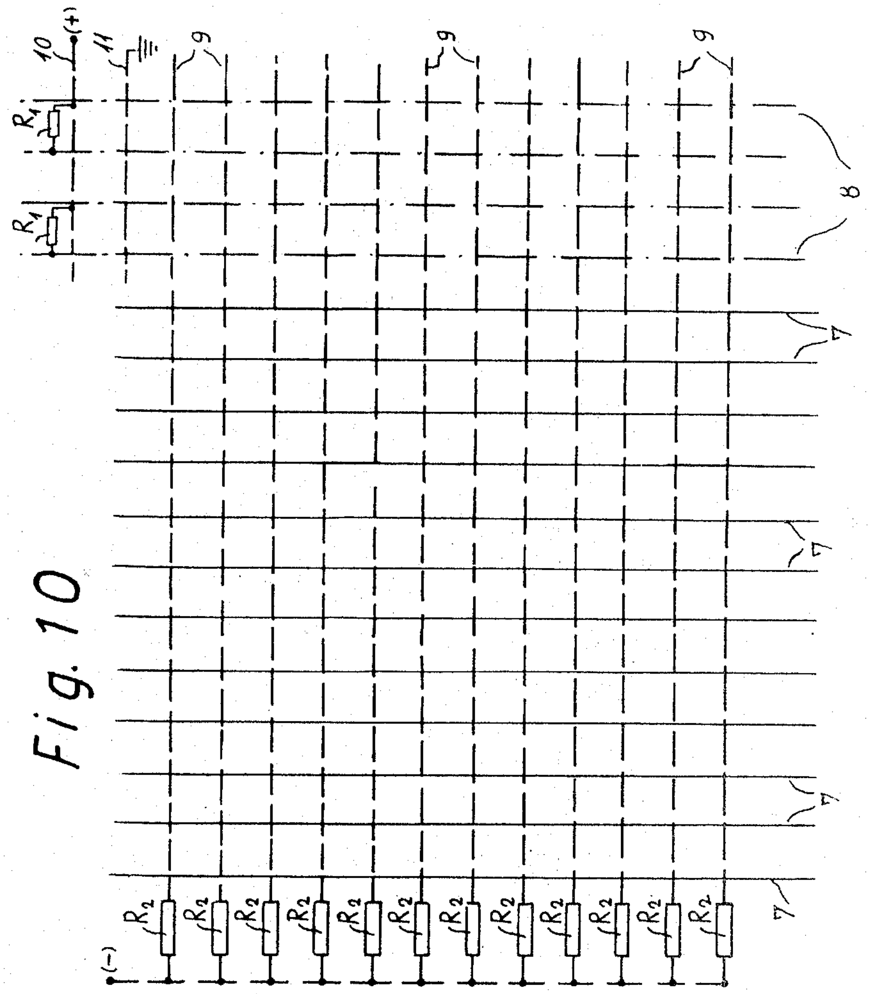
Figure 11:
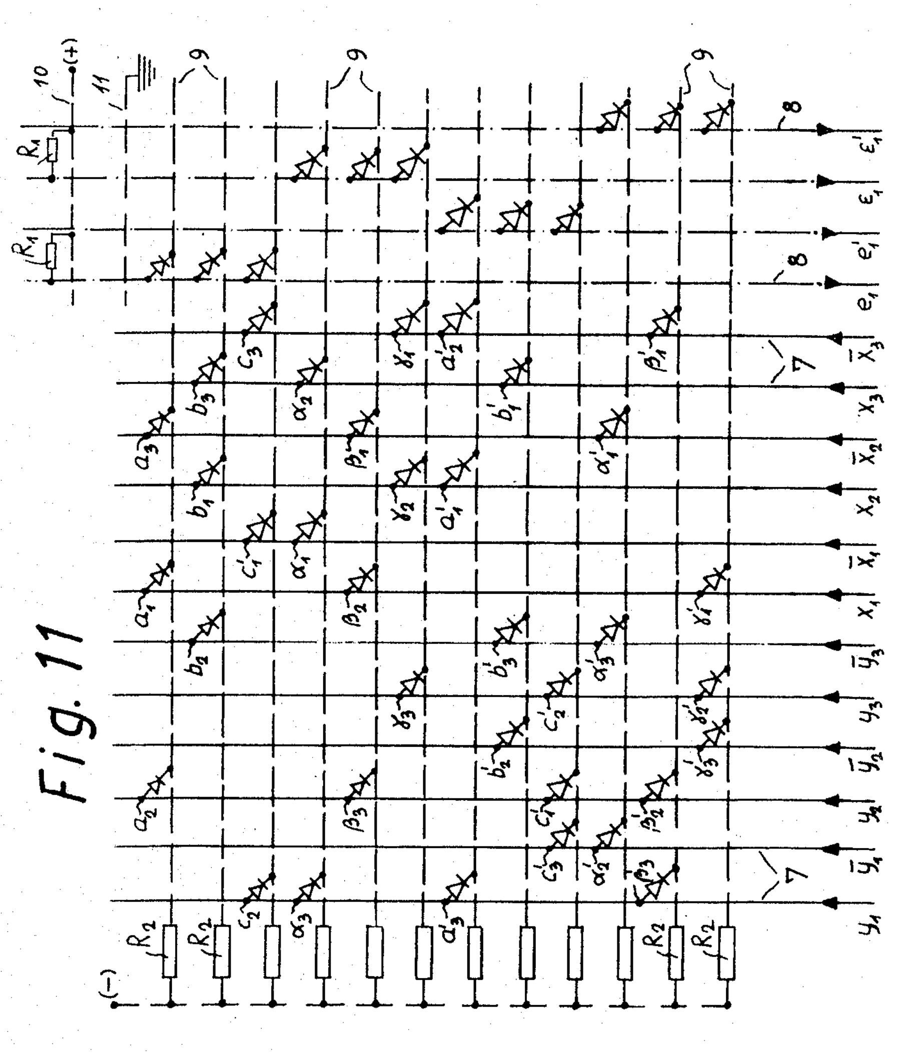

FIGURE 4*a* shows a modification of the arrangement shown in FIGURE 4;

FIGURES 5 to 9 show five other variants of the device;

FIGURE 10 shows a printed matrix;

FIGURE 11 shows the matrix of FIGURE 10 equipped with diodes.

Figure 1:
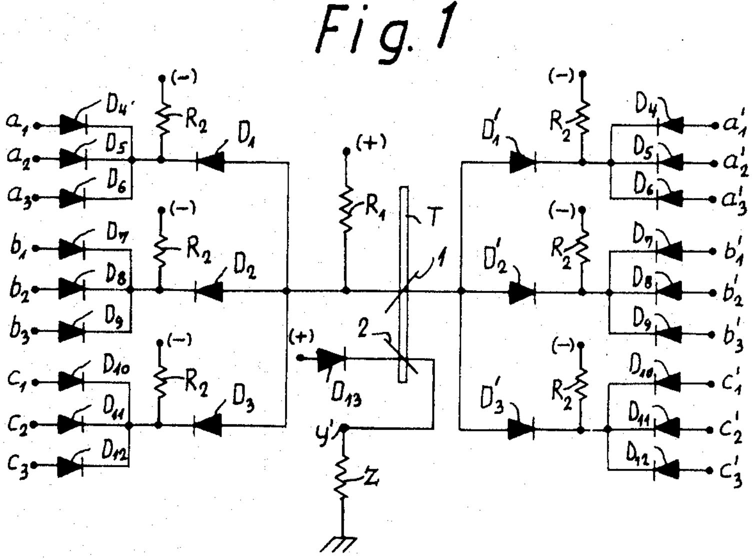
FIGURE 1 is a basic circuit diagram of the device.

As is shown in FIGURE 1, the device comprises a magnetic core T formed of a magnetic material having a rectangular hysteresis diagram and surrounded by two oppositely wound windings 1 and 2. The core and its windings are shown diagrammatically in accordance with the Karnaugh convention. In accordance with this convention, the winding of a core is represented by a segment of a straight line inclined at 45° to the horizontal line representing the connections of the winding. That segment is inclined to the right or to the left according to whether the winding is wound in one or the other direction. If the direction of the current is not indicated, it means it flows from left to right. The direction of the magnetic field is obtained by "reflection" of the current by an imaginary mirror represented by the inclined segment of a straight line.

Figure 2:
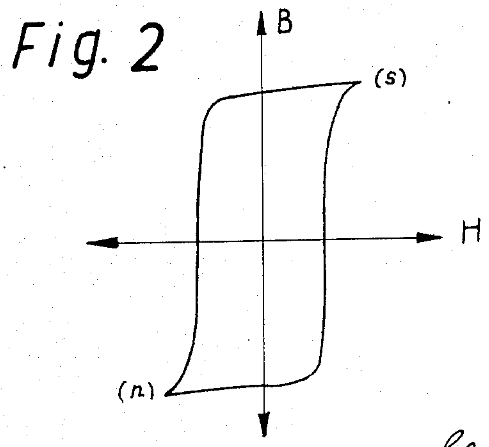
FIGURE 2 shows the hysteresis diagram of a magnetic core.

Consequently, referring to FIGURE 1, the field produced by the winding 1 is oriented upwardly while that produced by the winding 2 is oriented downwardly. The first field produced by the winding 1, causes the magnetization of the core to change so as to become magnetically saturated with "S" polarity, while the second field produced by winding 2 drives it back to its normal state of being saturated with "N" polarity, or, if it is already in the normal state, having no effect on it (see FIGURE 2). The windings 1 and 2 operate, therefore, in opposition to each other.

The core T is, therefore, a bistable element having two stable states (states "S" and "N") capable, consequently, of storing a binary number or digit represented, for example, by the binary digits 0 and 1.

On the left, the winding 1 of the core T is connected on the one hand by a resistance $R_1$ to a source of positive impulses (not shown) and on the other hand to the positive electrodes of three diodes $D_1$–$D_3$. The negative electrode of each of the diodes $D_1$–$D_3$ is connected on the one hand by a resistance $R_2$ to a source of negative impulses not shown and on the other hand to the negative electrodes of groups of three diodes $D_4$–$D_6$, $D_7$–$D_9$ and $D_{10}$–$D_{12}$, respectively. The positive electrodes of the diodes of each of these three groups are connected to groups of inputs $a_1$–$a_3$, $b_1$–$b_3$ and $c_1$–$c_3$ respectively. It is to be noted that the positive impulses in the circuit including winding 1 must be in phase with the negative impulses therein.

On the right, the winding 1 is connected to an analogous arrangement symmetrical with that on the left with the exception of the resistance $R_1$ and the source of positive impulses. The positive electrodes of the diodes of each of the three groups $D_4$–$D_6$, $D_7$–$D_9$ and $D_{10}$–$D_{12}$ are connected to groups of inlets $a'_1$–$a'_3$, $b'_1$–$b'_3$ and $c'_1$–$c'_3$ respectively.

The winding 2 is connected on the left to a source of alternating current, not shown, through a diode $D_{13}$ so that only the positive part of the current is transmitted to the alternating winding; on the right, it is connected to an output $y'$. Between the output $y'$ and earth is connected a load impedance Z which is much smaller than the impedance of the winding 2 when the core is not saturated.

It is to be noted that the impulses, both those which are positive and those which are negative, are obtained from sources of alternating current, the diodes in the circuit being oriented so as to allow only the desired one of the two alternations of the current to be effective. The positive impulses with which the winding 2 is to be fed must be 180° out of phase relatively to the impulses with which the winding 1 is to be fed.

As can be seen, the logical device described above is formed of two symmetrical parts. Each of these two parts is governed by a well defined logical function. In order that the operation of the complete logical device may be better understood, the functioning of each of the two parts will be explained.

Considering the left-hand part of the device (assuming the right-hand end of the winding 1 being earthed) it will be seen that the source of positive impulses which is to feed the winding 1 of the core T is arranged between the latter and the said left-hand part. Consequently, when no signal is applied to the inputs $a_1$–$a_3$, $b_1$–$b_3$ and $c_1$–$c_3$, the latter being therefore earthed, the diodes $D_4$–$D_{12}$ are made conductive by the negative impulses (as marked in FIG. 1) so that there is nothing to prevent the positive impulses which are in phase with the negative impulses from taking the short circuit path, that is to say, through the diodes $D_1$–$D_3$ towards the resistances $R_2$ instead of proceeding towards the winding 1. As, in consequence, the latter is not energised, the core will not be flipped, to reverse its magnetization and will, therefore, remain in its saturated state "N." Therefore, a positive impulse now supplied to the winding 2 with a phase lag of 180° will find substantially a short circuit condition and a signal will therefore appear at the output $y'$.

In order to cause the core to reverse its magnetization, an impulse must be supplied to the winding 1. But the positive impulses will be directed towards the winding 1 only if the three diodes $D_1$–$D_3$ are blocked (they therefore form an "and" logical circuit). This will be the case when a positive signal is applied to at least one of the inputs of the three groups $a_1$–$a_3$, $b_1$–$b_3$, $c_1$–$c_3$ (each of these groups therefore constitutes an "or" logical circuit). It can be easily seen that the logical function which governs the presence or the absence of an electrical signal at the input of the winding 1 and, therefore, the change of magnetization of the core T, will be as follows:

$$y=(a_1+a_2+a_3)(b_1+b_2+b_3)(c_1+c_2+c_3)$$

or in its symbolic form $$y=S_1.S_2.S_3$$

where $Si=\Sigma j.a_i^j, a_i^j$ symbolising the input variables of digital nature of the logical function.

The core T having been changed from its "N" state to its "S" state, a positive impulse then supplied to the winding 2 with a phase lag of 180° will have the effect of returning the core T from its "S" to its "N" state. As the core is not saturated during this period of return, the winding 2 will display a very high impedance and, consequently, no signal will appear at the output $y'$.

As can be seen, the core T endows the output $y'$ with a value which is the complement of $y$. Consequently, the formula of the logic function which governs this output is:

$$y'=\bar{y}=\overline{(a_1+a_2+a_3)(b_1+b_2+b_3)(c_1+c_2+c_3)}$$
$$=\overline{(a_1+a_2+a_3)}\,\overline{(b_1+b_2+b_3)}\,\overline{(c_1+c_2+c_3)}$$
$$=\bar{a}_1\bar{a}_2\bar{a}_3+\bar{b}_1\bar{b}_2\bar{b}_3+\bar{c}_1\bar{c}_2\bar{c}_3$$

or in its symbolic form:

$$y'=P_1+P_2+P_3$$

that is to say a sum of products in which $$Pi=\pi_k \overset{-k}{a_i}$$

$a_i^{-k}$ symbolising the input variables.

It will thus be seen that the complementary values of the variables must be used at the inputs $a$, $b$, $c$.

Considering now the right-hand part of the device (disregarding the circuit at the left, particularly the connection of the winding 1 to a resistor $R_1$), it will be seen that the core is disposed between the source of positive impulses and the said right-hand part. It can easily be seen that this change of the relative position of the core and of the source of impulses modifies the logical function governing that part. Thus, in order that a positive impulse may pass through the winding 1 of the core T and therefore cause the latter to change its state of magnetization, it is sufficient that a single one of the three diodes $D'_1$–$D'_3$ be unblocked. That implies that the three inputs of only a single one of the three groups $a'$, $b'$ and $c'$ need be earthed so that there can be no signal at any one of the inputs of that group. On the other hand, in order that winding 1 may not be energised and therefore the core T not be changed in its magnetization, the three diodes $D'_1$–$D'_3$ must be blocked. For that purpose a signal must be applied to at least one of the inputs of each of the three groups $a'$, $b'$ and $c'$. Consequently the formula of the logical function which governs in this case the output $y'$ is:

$$y'=(a'_1+a'_2+a'_3)(b'_1+b'_2+b'_3)(c'_1+c'_2+c'_3)$$

or in its symbolic form $$y'=S_1S_2S_3$$

that is to say, a product of sums.

A conjunction of logical functions, governing both of said two symmetrical parts of the arrangement, will give the complex logical function governing the output $y'$ of the device as a whole, that is to say, the function:

$$y'=[\bar{a}_1\bar{a}_2\bar{a}_3+\bar{b}_1\bar{b}_2\bar{b}_3+\bar{c}_1\bar{c}_2\bar{c}_3]\,[(a'_1+a'_2+a'_3)(b'_1+b'_2+b'_3)(c'_2+c'_2+c_3')]$$

or in symbolic form $$y'=(P_1+P_2+P_3).S_1.S_2.S_3$$

that is to say, a product of a sum of products and of a product of sums.

As can be seen, the logical function which characterises the device in accordance with the invention is of sufficiently complex form to allow the most diverse problems to be solved easily.

In the example which has been described, each of the two symmetrical parts of the device comprises three groups of inputs with three inputs in each group. It goes without saying that there may be any number of groups and any number of inputs per group. The symbolic form of the logical function which can be evaluated by means of the device in accordance with the invention then becomes:

$$y'=(P_1+P_2+\ \ldots\ +P_m)(S_1.S_2\ \ldots\ S_n)$$

It is to be noted, as has been shown above, that the data to be included in the sum of products $(P_1+P_2+\ \ldots\ P_m)$ must be provided at the inputs of the device in the form of their respective complements. Also, in the explanations of operation given above, it was a question of the presence or absence of a signal at the inputs $a$, $b$, $c$, $a'$, $b'$ and $c'$, that is to say, of these inputs being supplied with current or being earthed. It is to be understood that both in the first and in the second of these two cases, it is a question of all or nothing (1 or 0).

The data are introduced by means of positive impulses provided by the positive alternation derived from an alternating current source. The elaboration of the logical function is therefore effected during one half cycle. During this half cycle, the core changes from the "N" state to the "S" state if a positive impulse is supplied to its winding 1 or remains in its "N" state if no such impulse is provided. Now, as has been shown above, the condition which must exist in order that an impulse may be supplied to the winding 1 is that a positive electrical signal shall be present at one and absent at the other of the two ends thereof. These ends form, indeed, the two inputs of the bistable element constituted by the core T which have to act in conjunction. During the next half cycle, a positive impulse is supplied to the winding 2 of the core so that the core is brought back from the "S" state to the "N" state, or, if it were already in the latter state, the impulse appears at the output $y'$ of the device. As can be seen, the data appearing at the output of the device are trailing behind those provided at the inputs by 180°.

The fact that the inputs and the output are 180° out of phase is a disadvantage. It is, indeed, often necessary that data obtained at the output be re-fed to one or the other of the inputs so that it is advantageous to re-establish the phase relationship of the inputs and the output in order that the output may be connected to the inputs.

Figure 3:
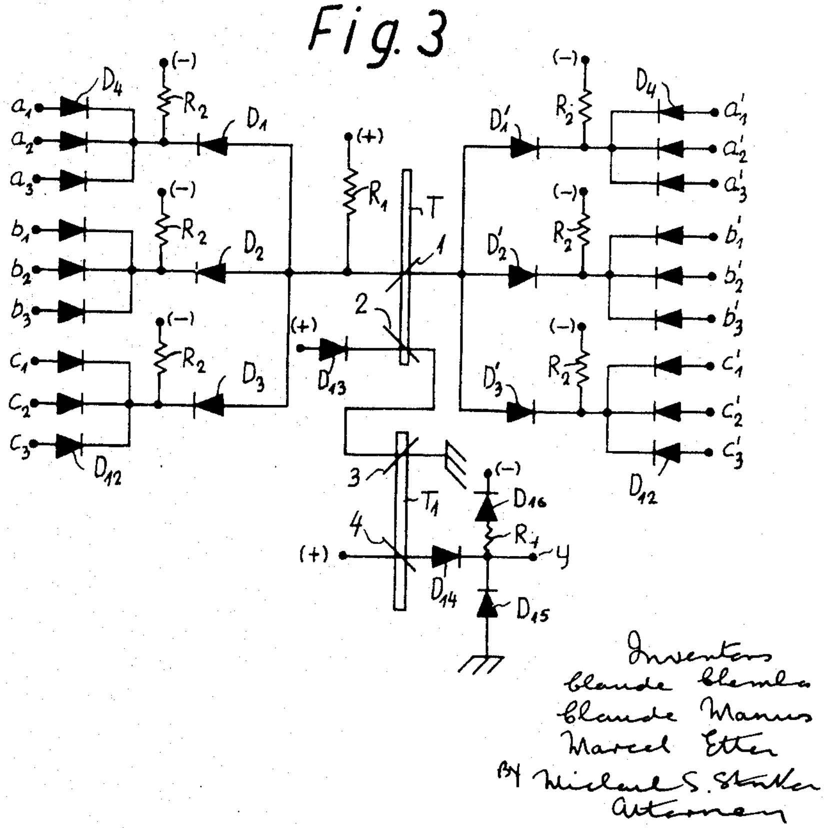
FIGURES 3 and 4 show two variants of the same device comprising a second core.

For this purpose, the device in accordance with the invention may be modified as shown in FIGURE 3.

In this modification, the device described above is provided with a second magnetic core $T_1$ also provided with two oppositely wound windings 3 and 4. The input to the winding 3 is connected to the output of the winding 2 of the core T, the output of winding 3 being earthed. The input to the winding 4 is connected to a source of positive impulses and its output to the positive electrode of a diode $D_{14}$. The negative electrode of this diode is connected to the negative electrode of a diode $D_{15}$ having its positive electrode earthed, and to an output $y$ which constitutes the output of the device, and further through a resistance $R_4$ to the positive electrode of a diode $D_{16}$ the negative electrode of which is connected to a source of negative impulses. These negative impulses are in phase with the positive impulses at the input of the winding 4 which are also in phase with the positive impulses fed to the winding 1 of the core T. It is to be noted that because of the construction of the device only two sources of alternating current, 180° out of phase, are used for obtaining both the positive and the negative impulses. It is advantageous to use asymmetrical sources providing a voltage the amplitude of negative alternation of which is greater than that of positive alternation. This allows the positive tension induced in the windings 2 and 4 to be compensated by the windings 1 and 3 respectively when the latter are supplied with positive impulses.

The core $T_1$ functions in the same manner as the core T. The field produced by the winding 3 causes it to flip into its "S" state, the field produced by the winding 4 causing it to return to its "N" state. Consequently, when a signal appears at the output of the winding 2 of the core T, it is sent through the winding 3 of the core $T_1$. This results in flipping the core $T_1$ from its "N" state to its "S" state so that the positive impulse which is supplied to the winding 4 during the next half cycle will cause the core $T_1$ to flip from its "S" state to its "N" state. Consequently, no signal (information 0) will appear at the output.

As can be seen, the output occurs with a lag of 360° relative to the inputs $a$, $b$, $c$, $a'$, $b'$ and $c'$ so that the "in phase" relationship is re-established. It is to be noted, moreover, that the output is "1" when the inputs have caused the core 8 to flip to its "S" state. The complex logical function which then governs the output $y$ is:

$$y=[(a_1+a_2+a_3)(b_1+b_2+b_3)(c_1+c_2+c_3)]\ [\bar{a}'_1\bar{a}'_2\bar{a}'_3+\bar{b}'_1\bar{b}'_2\bar{b}'_3+\bar{c}'_1\bar{c}'_2\bar{c}'_3]$$

It can be seen easily that the logical device in accordance with the modification shown in FIGURE 3 which has been described above allows information to be stored. Indeed, the output $y$ could be connected to the inputs of the device, and the output signal could be used as an input signal.

It is frequently necessary to provide two outputs, a direct output $y$ and a complementary output $\bar{y}$.

FIGURE 4 shows a modification of the logical device in accordance with the invention which allows for the provision of two such outputs. Here, the second core $T_1$ has a third winding 5 wound similarly as the winding 4. One of its ends is earthed and the other is connected to the positive electrode of a diode $D_{17}$ the negative electrode of which is connected to the output $\bar{y}$.

The windings 4 and 5 therefore function as the primary and secondary coils of a transformer. Thus, when the core $T_1$ is saturated there is no induction in the winding 5 and the complementary output $\bar{y}$ is earthed. As a signal appears at the output $y$ when the core $T_1$ is saturated, there will be no signal at the output $\bar{y}$ and vice versa. Thus, two outputs, one direct and the other complementary, are provided.

In the modification shown in FIGURE 4*a*, the end of the winding 5 which is not earthed is connected to the negative electrode of a diode of which the positive electrode is connected on the one hand to the output $\bar{y}$ and on the other hand to a source of positive impulses through a resistance, these impulses being in phase with those which are supplied to the winding 4. Thus, the impulses emitted by the said source will progress either towards the output $\bar{y}$ when the diode is blocked by the current induced in the winding 5, or to earth through the diode and the winding 5 when the core $T_1$ is saturated.

Obviously, the two outlets could be provided in a device having only one core (FIGURE 1). For that purpose all that is necessary is to provide a third winding identical with the winding 5 of FIGURE 4.

In the device described above, the orientation of the diodes and the polarity of the sources of impulses are such that that the data supplied to the inputs $a$, $b$, $c$, $a'$, $b'$ and $c'$ are given by means of positive signals. It goes without saying, however, that the device in accordance with the invention could be so organised that these data are given by means of negative signals.

Figure 5:
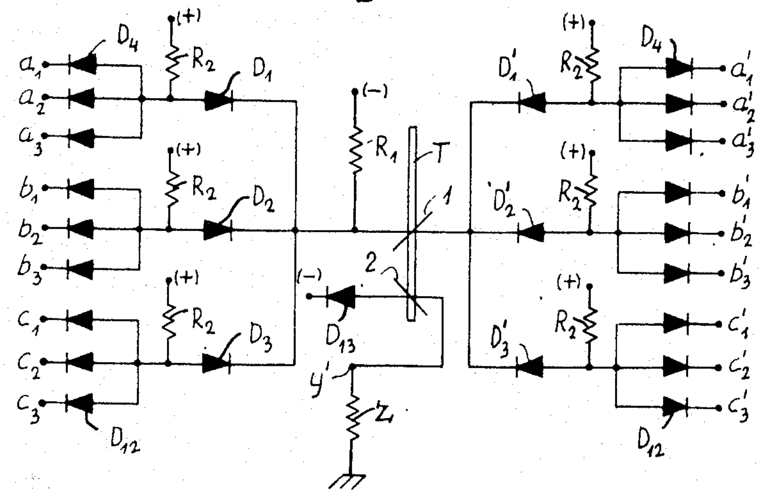

FIGURE 5 shows such a variant of the device. As can be seen the orientation of all the diodes $D'_1$–$D'_3$ etc. has been reversed as has the polarity of the sources of impulses. It can be easily seen that the complex logical function which governs the outlet $y'$ is:

$$y'=[\bar{a}_1\bar{a}_2\bar{a}_3+\bar{b}_1\bar{b}_2\bar{b}_3+\bar{c}_1\bar{c}_2\bar{c}_3]\ [(a'_1+a'_2+a'_3)(b'_1+b'_2+b'_3)(c'_1+c'_2+c'_3)]$$

which is the same as that which governs the device of FIGURE 1.

Figure 6:
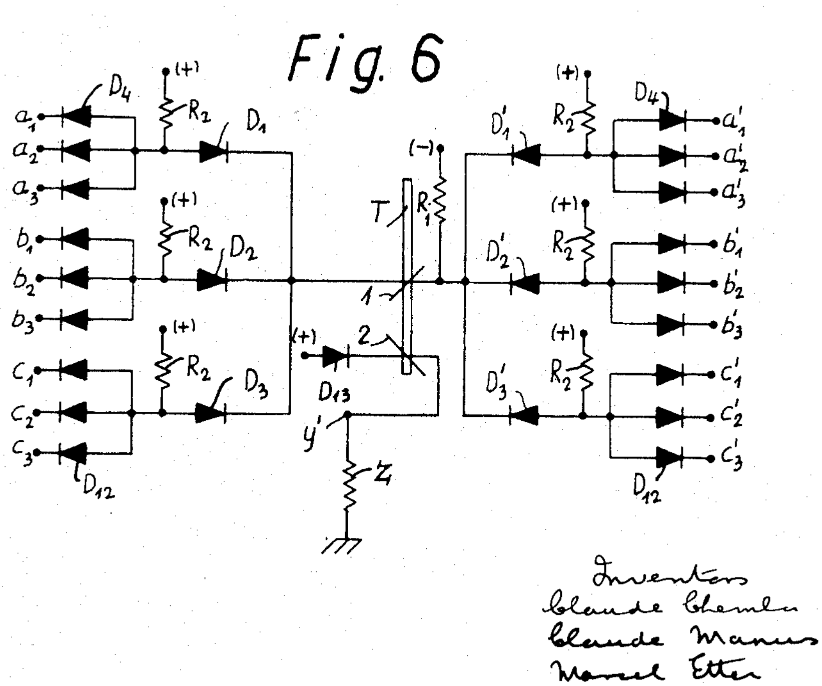

FIGURE 6 shows another variant of the device in which the orientation of the diodes and the polarity of the sources of impulses are the same as before (FIGURE 5) except for the orientation of the diode $D_{13}$ and the polarity of the source to which it is connected which remain as in the device shown in FIGURES 1, 3 and 4. On the other hand, the source of impulses previously connected to the left-hand end of the winding 1 is now connected to the right-hand end of the latter. The data at the inputs $a$, $b$, $c$, $a'$, $b'$ and $c'$ can be supplied as positive signals. The complex logical function which governs the outlet $y'$ is then:

$$y'=[\bar{a}_1\bar{a}_2\bar{a}_3+\bar{b}_1\bar{b}_2\bar{b}_3+\bar{c}_1\bar{c}_2\bar{c}_3][(a'_1+a'_2+a'_3)(b'_1+b'_2+b'_3)(c'_1+c'_2+c'_3)]$$

which is the same as before.

As has been shown above, the logical circuit in accordance with the invention allows for the transformation of complex logical functions of the type $$y=S_1S_2\ldots S_n(P_1+P_2+\ldots+P_m)$$

It is possible to provide a device which allows this formula to be more elaborate. Indeed, by providing the core T with a still further winding connected as is the winding 1 to two series of groups of inputs, it is possible to set up an "or" logical function by means of the core T which allows two logical functions of the above type to be mixed.

Figures 7, 9:
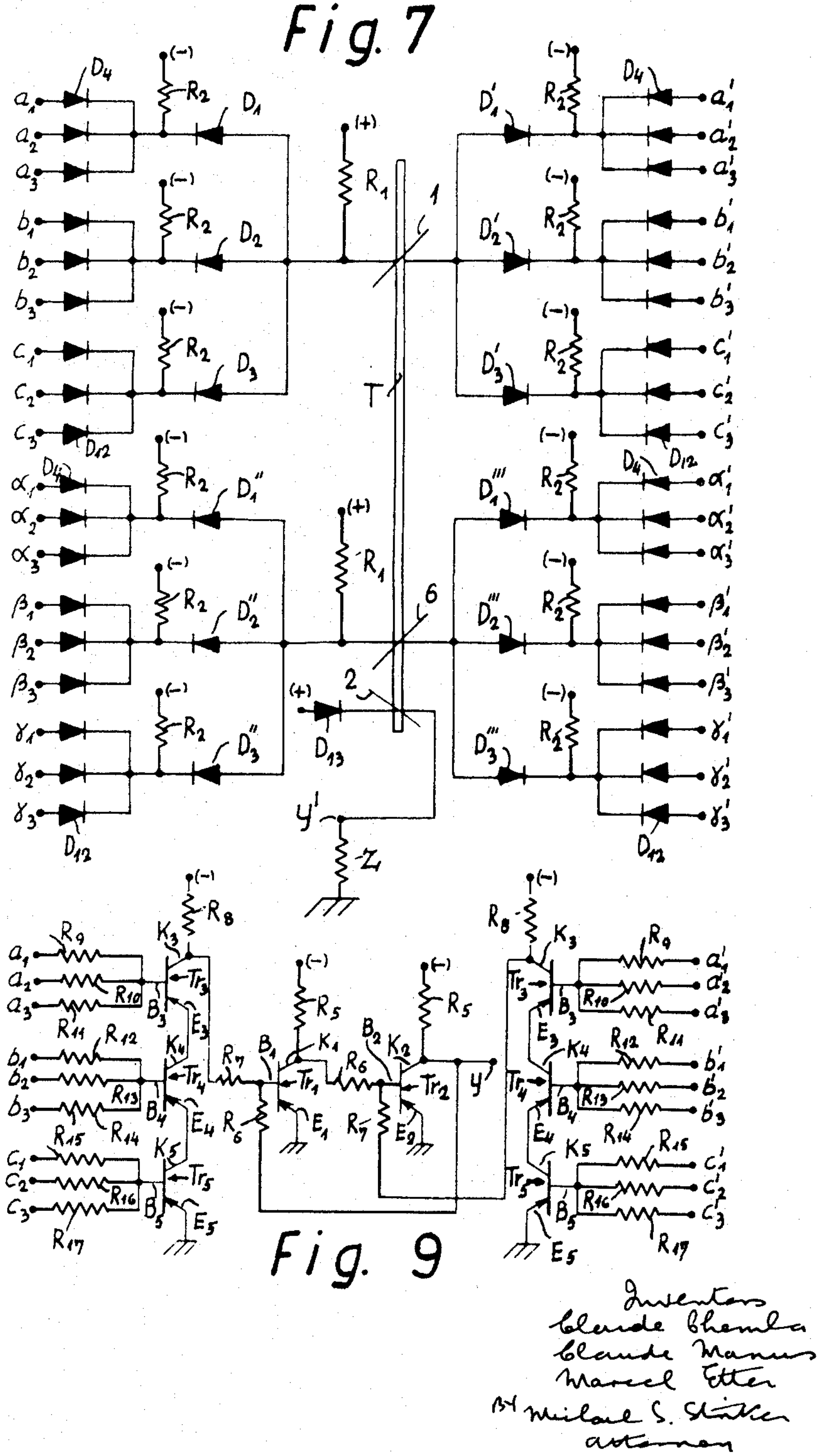

FIGURE 7 shows such a device. As can be seen, the device shown in FIGURE 1 is supplemented by the provision of a third winding 6 on the core T connected as is the winding 1 to two series of groups of inputs $\alpha,\beta,\gamma$ and $\alpha',\beta',\gamma'$ respectively. It can be easily understood from the explanations which have already been given that the function governing the output $y'$ of this device is:

$$y'=[\bar{a}_1\bar{a}_2\bar{a}_3+\bar{b}_1\bar{b}_2\bar{b}_3+\bar{c}_1\bar{c}_2\bar{c}_3][(a'_1+a'_2+a'_3)(b'_1+b'_2+b'_3)(c'_1+c'_2+c'_3)]+[\alpha_1\alpha_2\alpha_3+\beta_1\beta_2\beta_3+\gamma_1\gamma_2\gamma_3][(\alpha'_1+\alpha'_2+\alpha'_3)(\beta'_1+\beta'_2+\beta'_3)(\gamma'_1+\gamma'_2+\gamma'_3)]$$

or in symbolic form $$y'=(P_1+P_2+P_3)S_1S_2S_3+(p_1+p_2+p_3)s_1s_2s_3$$

It will be understood, as has been said above, that the number of groups of inputs, as well as the number of inputs in each group, can be diminished or increased at will.

Figure 8:
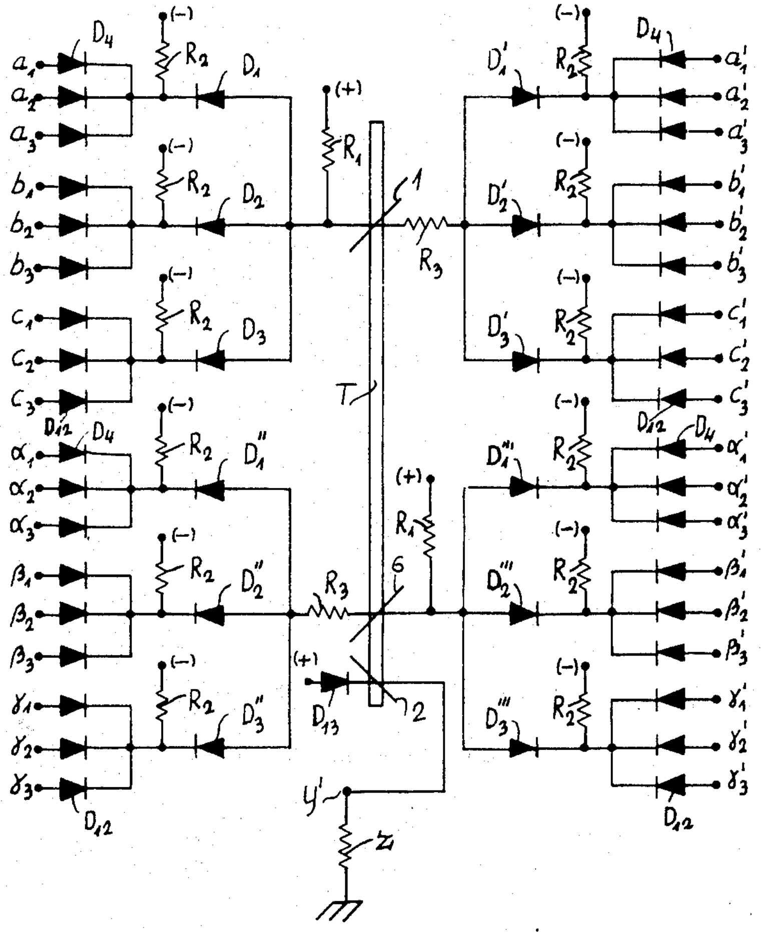

FIGURE 8 shows a variant of the device described above. According to this variant, the source of positive impulses to be fed to the winding 6 is connected on the right instead of the left of core T as was the case in the circuit shown in FIGURE 7. That, as far as the magnetic field is concerned, is the equivalent of providing a winding in opposition to the winding 1. Consequently, the complex logical function which can be evaluated by means of this device is an "and" function obtained by the conjunction of two functions performed respectively by winding 1 and the winding 6. It is to be noted that a resistance $R_3$ is connected in series with each of the windings 1 and 6, the function of which is to limit the current arising out of the mutual inductive action of the said windings. The function applied to the winding 6 must be furnished in its complementary form. This complex function is:

$$y'=[(\bar{a}_1\bar{a}_2\bar{a}_3+\bar{b}_1\bar{b}_2\bar{b}_3+\bar{c}_1\bar{c}_2\bar{c}_3)(a'_1+a'_2+a'_3)(b'_1+b'_2+b'_3)(c'_1+c'_2+c'_3)][(\alpha_1+\alpha_2+\alpha_3)(\beta_1+\beta_2+\beta_3)(\gamma_1+\gamma_2+\gamma_3)+\bar{\alpha}'_1\bar{\alpha}'_2\bar{\alpha}'_3+\bar{\beta}'_1\bar{\beta}'_2\bar{\beta}'_3+\bar{\gamma}'_1\bar{\gamma}'_2\bar{\gamma}'_3]$$

or in symbolic form $$y'=(P_1+P_2+P_3)(S_1S_2S_3)(s_1s_2s_3+p_1+p_2+p_3)$$

It goes without saying that each of the two logical devices shown in FIGURES 5 and 6 could be provided with two outputs, namely, a direct output $y$ and a complementary output $\bar{y}$ in the manner described above in connection with FIGURE 4. Each output would provide respectively the solution of the two complex functions:

$$y=[(a_1+a_2+a_3)(b_1+b_2+b_3)(c_1+c_2+c_3)+\bar{a}'_1\bar{a}'_2\bar{a}'_3+\bar{b}'_1\bar{b}'_2\bar{b}'_3+\bar{c}'_1\bar{c}'_2\bar{c}'_3][(\alpha_1+\alpha_2+\alpha_3)(\beta_1+\beta_2+\beta_3)(\gamma_1+\gamma_2+\gamma_3)+\alpha'_1\alpha'_2\alpha'_3+\beta'_1\beta_2'\beta'_3+\gamma'_1\gamma'_2\gamma'_3]$$

$$\bar{y}=[\bar{a}_1\bar{a}_2\bar{a}_3+\bar{b}_1\bar{b}_2\bar{b}_3+\bar{c}_1\bar{c}_2\bar{c}_3][(a'_1+a'_2+a'_3)(b'_1+b'_2+b'_3)(c'_1+c'_2+c'_3)]+[\alpha_1\alpha_2\alpha_3+\beta_1\beta_2\beta_3+\gamma_1\gamma_2\gamma_3][(\alpha'_1\alpha'_2\alpha'_3)(\beta'_1\beta'_2\beta'_3)(\gamma'_1\gamma'_2\gamma'_3)]$$

$$y=[(a_1+a_2+a_3)(b_1+b_2+b_3)(c_1+c_2+c_3)+\bar{a}'_1\bar{a}'_2\bar{a}'_3+\bar{b}'_1\bar{b}'_2\bar{b}'_3+\bar{c}'_1\bar{c}'_2\bar{c}'_3]+[\bar{\alpha}_1\bar{\alpha}_2\bar{\alpha}_3+\bar{\beta}_1\bar{\beta}_2\bar{\beta}_3+\bar{\gamma}_1\bar{\gamma}_2\bar{\gamma}_3)(\alpha'_2+\alpha'_2+\alpha'_3)(\beta'_1+\beta'_2+\beta'_3)(\gamma'_1+\gamma'_2+\gamma'_3)]$$

$$\bar{y}=[(\bar{a}_1\bar{a}_2\bar{a}_3+\bar{b}_1\bar{b}_2\bar{b}_3+\bar{c}_1\bar{c}_2\bar{c}_3)(a'_1+a'_2+a'_3)(b'_2+b'_2+b'_3)(c'_1+c'_2+c'_3)][(\alpha_1+\alpha_2+\alpha_3)(\beta_1+\beta_2+\beta_3)(\gamma_1+\gamma_2+\gamma_3)+\alpha'_1\alpha'_2\alpha'_3+\beta'_1\beta'_2\beta'_3+\gamma'_1\gamma'_2\gamma'_3]$$

or in symbolic form $$y=(S_1S_2S_3\ldots S_n+P_1+P_2+P_3+\ldots+P_m)(s_1s_2s_3\ldots s_n+p_1+p_2+p_3+\ldots+p_m)$$

$$\bar{y}=(P_1+P_2+P_3+\ldots P_m)(S_1S_2S_3\ldots S_n)+(p_1+p_2+p_3+\ldots p_m)(s_1s_2s_3\ldots s_n)$$

$$y=(S_1S_2S_3\ldots S_n+P_1+P_2+P_3+\ldots+P_m)+(p_1+p_2+p_3+\ldots p_m)(s_1s_2s_3\ldots s_n)$$

$$\bar{y}=(P_1+P_2+P_3+\ldots P_m)(S_1S_2S_3\ldots S_n)(s_1s_2s_3\ldots s_n+p_1+p_2+p_3+\ldots+p_m)$$

It goes without saying that these devices could be modified by providing yet another winding on the core T which would be connected in the same way as the windings 1 and 6 to two series of groups of inputs allowing the formulae set up above to be elaborated still further. Indeed, each of the four complex functions set out above would then be constituted by three basic complex functions governing the basic logical device shown in FIGURE 1.

The logical device described above by way of example thus uses diodes and magnetic cores, the latter functioning both as magnetic amplifiers and bi-stable elements. In contrast to the known logical devices, in the device in accordance with the invention, the logical operations are effected both by the diodes and the cores. Having regard to the complexity of the logical functions which the device can cope with, the device is relatively simple and comprises only few elements.

The logical device in accordance with the invention can also be built with elements other than magnetic cores and diodes. Thus, the magnetic core could be replaced, for example, by a magnetic amplifier or by another kind of bi-stable element having at least two inputs such, for example, by a bi-stable transistor arrangement. Clearly, the bi-stable element formed by a magnetic amplifier or by transistors would no longer be an element of synchronous type. To render it synchronous, it is necessary to have recourse to special devices using a time base. It is to be noted that the use of non-synchronous bi-stable elements leads, in the case of the synthesis of sequential circuits, to problems which are more difficult to solve. It is also to be noted that the asynchronous bi-stable elements do not require the supply of data in the form of impulses. Continuous signals can be used instead.

As to the diodes and, in particular, the diodes $D_4$–$D_{12}$ connected to the inputs $a$, $b$, $c$, $a'$, $b'$ and $c'$ of the device, these could be replaced by other elements such, for example, as resistances or transistors. The diodes $D_1$–$D_3$ connected to the inputs of the bi-stable element could be replaced by transistors.

FIGURE 9 shows a circuit diagram of a logical device comprising a transistor type bi-stable element and logical circuits formed of resistances and transistors. The bi-stable element comprises to transistors $Tr_1$ and $Tr_2$ of the p-n-p type, for example, inter-connected in known manner. The collector $K_1$ of the transistor $Tr_1$ is connected on the one hand to a negative source of current (not shown) through a resistance $R_5$ and on the other hand through a resistance $R_6$ to the base $B_2$ of the transistor $Tr_2$, the collector $K_2$ of the latter being connected in the same way to a source of negative current, to the base $B_1$ of the transistor $Tr_1$ as well as to the output $y$. The two emitters $E_1$ and $E_2$ are earthed. Each of the two bases $B_1$ and $B_2$ which constitute the two inputs of the bi-stable device is connected, respectively, through a set of resistances $R_7$ and $R_8$ to a negative source of current which is itself connected (in either part of the device) to the collector $K_3$ of a transistor $Tr_3$ connected in series with two other transistors $Tr_4$ and $Tr_5$, the emitter $E_5$ of the latter being earthed. Each of the bases $B_3$, $B_4$ and $B_5$ of the said transistors is connected, respectively, to a group of three resistances $R_9$–$R_{11}$, $R_{12}$–$R_{14}$ and $R_{15}$–$R_{17}$, each of which is connected to one of the inlets $a$, $b$, $c$, $a'$, $b'$ and $c'$, respectively.

The complex function which governs the output $y$ is:

$$y=\overline{(a_1+a_2+a_3)(b_1+b_2+b_3)(c_1+c_2+c_3)}$$
$$(a'_1+a'_2+a'_3)(b'_1+b'_2+b'_3)(c'_1+c'_2+c'_3)$$
$$=a_1a_2a_3+b_1b_2b_3+c_1c_2c_3$$
$$(a'_1+a'_2+a'_3)(b'_1+b'_2+b'_3)(c'_1+c'_2+c'_3)$$

It is to be noted that because of the use of transistors of the p-n-p type, the data supplied to the inputs $a$, $b$, $c$, $a'$, $b'$, $c'$ must be in the form of negative signals.

Because of its simplicity, the device in accordance with the invention lends itself well to the use of a printed matrix. Indeed, the matrix can be so formed that it is only the diodes (or other equivalent elements) which form the logical circuits and corresponding to each of the variables constitute the logical function to be evaluated, are soldered directly to the printed circuits comprising it.

That allows standard logical devices to be formed by means of which each problem will give to an individual arrangement without wasting any already existing elements which would not participate directly in the evaluation of the logic function. Such a device could, therefore, be adapted to any problem whatever by modifying the arrangement accordingly.

A method of preparing a matrix allowing the formation of logical devices of a certain desired type, the most complicated of which would be that shown in FIGURE 7, and comprising additionally a second core $T_1$ provided with three windings connected to the first core T and to the two outputs $y$ and $\overline{y}$ as shown in FIGURE 4 will now be described by way of example. The matrix is provided in such a way as to enable the number of groups of inputs, as well as the number of inputs in each group, to be greater than that of the device shown in FIGURE 7.

The matrix is formed by means of a plate of insulating material provided on both faces with printed conductors in the following manner (FIGURE 10).

One of the faces, in the case under consideration the front face, has twelve columns 7 (in full lines) serving to connect the inputs of the device ($a$, $b$, $c$, $a'$, $b'$, $c'$, $\alpha$, $\beta$, $\gamma$, $\alpha'$, $\beta'$, $\gamma'$) to the electrodes of the diodes $D_4$–$D_{12}$. On the same face, there are four other columns 8 serving to connect the electrodes of the diodes $D_1$–$D_3$ on the one hand to the resistances $R_1$ and on the other hand to the ends of the windings 1 and 6 (FIGURE 7), designated hereafter $e$, $e'$ and $\epsilon$, $\epsilon'$, respectively.

On its second face, the matrix has twelve lines 9 (shown dotted) serving to connect the electrodes of the diodes $D_4$–$D_{12}$ on the one hand to the resistance $R_2$ and on the other hand to the electrodes of the diodes $D_1$–$D_3$. On the same face, there are two other lines 10 and 11, the first of which serves to connect a source of impulses through the resistance $R_1$ to the ends $e$ and $\epsilon$ of the windings 1 and 6 and the second of which serves, when required, to connect the ends $e'$ and $\epsilon'$ of those coils to earth.

In addition to the matrix described above, the device will comprise the cores T and $T_1$ and their windings (or other bi-stable devices) as well as the diodes and the resistances connected to the windings 2–5 which will constitute a fixed subassembly (not shown in the drawing) also formed on a separate plate or on the plate, of the matrix, as printed circuits and destined to be connected to the matrix in the following manner.

The columns 8 of the matrix have to be connected to the ends $e$, $e'$ and $\epsilon$, $\epsilon'$ of the windings 1 and 6, respectively, for example, by attachable connections. Similarly, the output $y$ and $\overline{y}$ of the circuit related core $T_1$ can be connected to the columns 7 of the matrix when the outputs are to be used as inputs, as would be the case when using the complex function for storing purposes.

FIGURE 11 shows a matrix assembly based on the pattern of FIG. 10, and equipped with the diodes in such a way as to allow the evaluation of the following complex logical function:

$$y=[(x_1+y_2+\overline{x}_2)(x_2+\overline{y}_3+x_3)(\overline{x}_1+y_1+\overline{x}_3)$$
$$(\overline{x}_2x_3\overline{y}_1+\overline{x}_3y_2y_3+\overline{y}_2\overline{y}_3y_1)]$$
$$+[(\overline{x}_1+x_3+y_1)(\overline{x}_2+x_1+y_2)(\overline{x}_3+y_2+y_3)$$
$$(x_2y_1y_3+x_3y_2y_1+x_1\overline{y}_3y_2)]$$

In this formula which is of the same form as the formula $$y=[(a_1+a_2+a_3)(b_1+b_2+b_3)(c_1+c_2+c_3)$$
$$(\overline{a}'_1\overline{a}'_2\overline{a}'_3+\overline{b}'_1\overline{b}'_2\overline{b}'_3+\overline{c}'_1\overline{c}'_2\overline{c}'_3)]$$
$$+[(\alpha_1+\alpha_2+\alpha_3)(\beta_1+\beta_2+\beta_3)(\gamma_1+\gamma_2+\gamma_3)$$
$$(\overline{\alpha}'_1\overline{\alpha}'_2\overline{\alpha}'_3+\overline{\beta}'_1\overline{\beta}'_2\overline{\beta}'_3+\overline{\gamma}'_1\overline{\gamma}'_2\overline{\gamma}'_3)]$$

used earlier on, the variables $x$ and $\overline{x}$ designating variables of the external input, the variables $y$ and $\overline{y}$ designating the direct and complementary outputs used as inputs.

As can be seen by comparing the specific and general formulae given above, the variable $x_1$ can be used at each of the inputs $\alpha_1$, $\beta_2$ and $\gamma'_1$. The same comparison allows one to determine the different inputs at which the other variables $x$, $\overline{x}$, $y$, $\overline{y}'$ are to be introduced. These inputs are indicated in FIGURE 11.

As to the attachment of diodes to the matrix for the purpose of connecting the lines 9 to the columns 8, this can be easily understood by an inspection of FIGURE 11.

It is to be noted that the connection of the columns on one face and the lines on the other face of the plate by diodes is effected through holes made in appropriate places, so that one of the electrodes of the diode can be soldered to the column and the other to the line on the other face of the plate.

It is also to be noted that by increasing the number of columns 7 and 8 and of lines 9, the same matrix can be used or assembled in such a way as to allow the evaluation of several complex functions of the kinds governing the devices shown in FIGURES 7 and 8.

We claim:

1. In a logical computer for the evaluation of complex functions, in combination, a sheet member of insulating material, a first substantially parallel array of printed conductive lines on one face of said sheet member, and a second substantially parallel array of conductive lines extending in a direction transverse to said first array and printed on the other face of said sheet member, a plurality of perforations of said sheet member in predetermined relation to said first and second arrays of conductive lines; at least one bi-stable device having at least one first input and being adapted to assume one of its stable states upon application of electric energy to said first input, and having at least one second input and being adapted to assume the other one of its stable states upon application of electric energy to said second input, and having an output constituting an output of the computer, said bi-stable device being mounted on said sheet member, said inputs and said outputs being conductively connected to selected ones of said conductive lines, respectively; and at least a first group of logical circuits mounted on said sheet member and conductively connected with one of said lines connected with said first input, and at least a second group of logical circuits mounted on said sheet member and conductively connected with one of said lines connected with said second input, each of said groups of logical circuits comprising at least one "AND" circuit and at least one "OR" circuit, the output of one of the last mentioned circuits of the particular group being connected with the respective input of said bi-stable device, the input of said one of said circuits being connected to the output of the other one of said circuits of the respective group, and the inputs of each of the other ones of said circuits of said groups, respectively, constituting the inputs of the computer, said inputs and outputs of said logical circuits being respectively connected with correspondingly selected lines of said arrays so as to establish the required interconnections, so that the presence of a signal at one of the inputs of the computer and simultaneous absence of a signal at the other one of the inputs of the computer causes a change between the two stable states of the bi-stable device.

2. In a logical computer for the evaluation of complex functions, in combination, at least one first logical circuit arrangement having at least a first input and a first output and being adapted to furnish at said first output a first output signal upon application of an input signal to said first input thereof, said first input constituting a first input of the computer; at least one second logical circuit arrangement having at least a second input and second output and being adapted to furnish at said second output a second output signal upon application of an input signal to said second input thereof, said second input constituting a second input of the computer; at least one bistable device adapted to assume two different stable conditions; state-changer means associated with said bistable device for changing the condition of said bistable device between said different stable conditions, said state-changer means being connected to said first and second outputs of said first and second logical circuit arrangements, respectively, and constructed so as to change the condition of said bistable device between said different stable condition thereof when one of said first and second output signals is furnished through the respective output, but not when simultaneously both said first and second output signals are furnished through first and second outputs; and output means associated with said bistable device and having a third input for receiving electric pulses of predetermined polarity and a third output and being adapted to furnish at said third output a third output signal when at the moment of application of one of said electric pulses said bistable device is in one predetermined one of its different stable states, said third output constituting the output of the computer.

3. In a logical computer for the evaluation of complex functions, in combination, at least one first logical circuit arrangement including at least one OR-circuit and at least one AND-circuit in series arrangement and having at least a first input and a first output and being adapted to furnish at said first output a first output signal upon application of an input signal to said first input thereof, said first input constituting a first input of the computer; at least one second logical circuit arrangement including at least one OR-circuit and at least one AND-circuit in series arrangement and having at least a second input and a second output and being adapted to furnish at said second output a second output signal upon application of an input signal to said second input thereof, said second input constituting a second input of the computer; at least one bistable device adapted to assume two different stable conditions; control pulse input means for introducing control pulses of predetermined polarity; state-changer means associated with said bistable device for changing the condition of said bistable device between said different stable conditions, said state-changer means being connected to said first and second outputs of said first and second logical circuit arrangements, respectively, and to said control pulse input means and constructed so as to change the condition of said bistable device between said different stable condition thereof when simultaneously with application of one of said control pulses one of said first and second output signals is furnished through the respective output, but not when simultaneously both said first and second output signals are furnished through first and second outputs; and output means associated with said bistable device and having a third input for receiving electric pulses of predetermined polarity and a third output and being adapted to furnish at said third output a third output signal when at the moment of application of one of said electric pulses said bistable device is in one predetermined one of its different stable states, said third output constituting the output of the computer.

4. In a logical computer for the evaluation of complex functions, in combination, at least one first logical circuit arrangement having at least a first input and a first output and being adapted to furnish at said first output a first output signal upon application of an input signal to said first input thereof; at least one second logical circuit arrangement having at least a second input and a second output and being adapted to furnish at said second output a second output signal upon application of an input signal to said second input thereof; at least one bistable device adapted to assume two different stable conditions; and state-changer means associated with said bistable device for changing the condition of said bistable device between said different stable conditions, said state-changer means being connected to said first and second outputs of said first and second logical circuit arrangements, respectively, and constructed so as to change the condition of said bistable device between said different stable condition thereof when one of said first and second output signals is furnished through the respective output, but not when simultaneously both said first and second output signals are furnished through said first and second outputs.

5. A computer as claimed in claim 4, (a) wherein said bi-stable device comprises one magnetic circuit means, three windings being arranged on said magnetic circuit means, the first and third one of said windings constituting each a state changer means and beinng wound both in the same first winding direction, the second one of said windings being wound in a second direction opposite to said first winding direction for constituting part of an output means, the two ends of said first one of said windings being connected to said first and second outputs, respectively, of said first and second logical circuit arrangements, one end of said first winding being also connected to a source of first electric impulses, (b) wherein a third logical circuit arrangement analogous to said first logical circuit arrangement and having a third output is connected at said third output with one end of said third one of said windings, and a fourth logical circuit arrangement analogous to said second logical circuit arrangement and having a fourth output is connected at said fourth output with the other end of said third one of said windings, said one end of said third winding being also connected to a source of said first electric impulses, and (c) wherein said second one of said windings has two ends, one of said ends of said second winding being connected to a second source of second electric impulses, a diode being interposed between said one end of said second winding and said second source, the other end of said second winding constituting the output of said computer, said plurality of state changer means being constructed so as to change the condition of said bi-stable device between said different stable conditions thereof when any output signal is furnished to one of said first and third windings from the output of any of said logical circuit arrangements in the absence of application of one of said output signals from the output of another one of said logical circuit arrangements to the other end of the particular winding.

6. A computer as claimed i claim 5, including a resistor connected in series with said first winding, and a second resistor connected in series with said third winding, said resistors serving to limit currents developed by mutual inductive action of said first and third windings.

7. In a logical computer for the evaluation of complex functions, in combination, at least one bi-stable device including a first and a second input and state-changer means connected between said inputs for changing the state of said bi-stable device between one and another stable state thereof whenever electric energy is applied to said state-changer means through one of said inputs in the absence of application of electric energy to the other one of said inputs, and having an output constituting an output of the computer; and at least a first group of logical circuits connected with said first input, and at least a second group of logical circuits connected with said second input and controlling depending upon their conductive condition the applicability of electric energy to said state-changer means, each of said groups of logical circuits comprising at least one "AND" circuit and at least one "OR" circuit, the output of one of the last mentioned circuits of the particular group being connected with the respective input of said bi-stable device, the input of said one of said last mentioned circuits being connected to the output of the other one of said last mentioned circuits of the respective group, and the inputs of each of the said other ones of said circuits in said first and second groups of logical circuits, respectively, constituting the inputs of the computer, the application of energy to said state-changer means through said first and second inputs of said bi-stable device, respectively, depending upon the potentials appearing at said inputs of the computer and being transmitter through the respective logical circuits to the respectively connected input of said bi-stable device, so that depending upon application of electric energy to one of said inputs of said bistable device and depending upon the potentials simultaneously appearing at said inputs of the computer a signal appearing at one of said first and second inputs and applied to said state-changer means in the absence of a signal at the other one of said first and second inputs causes a change between the two stable states of the bistable device.

8. A computer as claimed in claim 7, wherein said bi-stable device comprises at least one magnetic circuit means and a first winding constituting said state changer means and arranged with one predetermined winding direction on said magnetic circuit means, and a second winding with opposite winding direction arranged on said magnetic circuit means, the two ends of said first winding constituting said first and second inputs, respectively, of said bi-stable device, one of said ends of said first winding being also connected to a source of first electric impulses, and said second winding having two ends, one of said ends of said second winding being connected with a second source of second electric impulses, a diode being interposed between said one end of said second winding and said second source, the other end of said second winding constituting said output of said bi-stable device.

9. A computer as claimed in claim 7, wherein said bi-stable device comprises at least one magnetic circuit means and a first winding constituting said state changer means and arranged with one predetermined winding direction on said magnetic circuit means, and a second winding with opposite winding direction arranged on said magnetic circuit means, the two ends of said first winding constituting said first and second inputs, respectively, of said bi-stable device, one of said ends of said first winding being also connected to a source of first electric impulses, and said second winding having two ends, one of said ends of said second winding being connected with a second source of second electric impulses lagging 180° behind said first impulses, a diode being interposed between said one end of said second winding and said second source, the other end of said second winding constituting said output of said bi-stable device.

10. A computer as claimed in claim 7, wherein said bi-stable device comprises at least one magnetic core means and a first winding constituting said state changer means and arranged with one predetermined winding direction on said magnetic core means, and a second winding with opposite winding direction arranged on said magnetic core means, the two ends of said first winding constituting said first and second inputs, respectively, of said bi-stable device, one of said ends of said first winding being also connected to a source of first electric impulses, and said second winding having two ends, one of said ends of said second winding being connected with a second source of second electric impulses, a diode being interposed between said one end of said second winding and said second source, the other end of said second winding constituting said output of said bi-stable device.

11. A computer as claimed in claim 7, wherein said bi-stable device comprises a first magnetic circuit means and at least two first windings arranged in winding directions opposite to each other on said first magnetic circuit means, the two ends of the first one of said first windings constituting said first and second inputs, respectively, of said bi-stable device, one of said ends of said first winding being also connected to a source of first electric impulses, the second one of said first windings having two ends, one of said ends of said second winding being connected with a second source of second electric impulses, a diode being interposed between said one end of said second winding and said second source, and wherein said bi-stable device comprises a second magnetic circuit means and at least two second windings arranged in winding directions opposite to each other on said second magnetic circuit means, the first one of said second windings having one end connected to ground, its other end being connected in series with the second end of said second one of said first windings arranged on said first magnetic circuit means, the second one of said second windings having one end connected to a third source of third electric impulses, and a second end connected to said output of said bi-stable device, a diode being interposed between said second end and said output.

12. A computer as claimed in claim 7, wherein said bi-stable device comprises a first magnetic circuit means and at least two first windings arranged in winding directions opposite to each other on said first magnetic circuit means, the two ends of the first one of said first winding constituting said first and second inputs, respectively, of said bi-stable device, one of said ends of said first winding being also connected to a source of first electric impulses, the second one of said first windings having two ends, one of said ends of said second winding being connected with a second source of second electric impulses, a diode being interposed between said one end of said second winding and said second source, and wherein said bi-stable device comprises a second magnetic circuit means and at least two second windings arranged in winding directions opposite to each other on said second magnetic circuit means, the first one of said second windings having one end connected to ground, its other end being connected in series with the second end of said second one of said first windings arranged on said first magnetic circuit means, the second one of said second windings having one end connected to a third source of third electric impulses synchronized with said first impulses, and a second end connected to said output of said bi-stable device, a diode being interposed between said second end and said output.

13. A computer as claimed in claim 11, wherein a third winding is arranged on said second magnetic circuit means, one end of said third winding being connected to ground, a diode being connected with one terminal to the second end of said third winding, the other terminal of said last mentioned diode constituting a second output of the computer.

14. A computer as claimed in claim 7, wherein said bi-stable device comprises two transistors, the emitter electrodes of both transistors being grounded, the collector electrode of the first one of said transistors being connected to a first source of electric potential, the collector electrode of the second one of said transistors, being connected to a second source of electric potential, the base of each transistor being connected with the collector electrode of the other transistor, the collector electrode of one of the transistors constituting the output of said bi-stable device, and the bases of said transistors constituting said first and second inputs, respectively, of said bi-stable device.

15. A computer according to claim 7, wherein said logical circuits comprise diodes.

16. A computer according to claim 7, wherein said logical circuits comprise transistors.

17. A computer as claimed in claim 7, wherein each of said groups of logical circuits comprise diode means and transistor means, one of said means constituting said "AND" circuits, the other of said means constituting said "OR" circuits.

18. A computer as claimed in claim 7, wherein in each of said groups of logical circuits those logical circuits which are connected with the inputs of said bi-stable device are constituted by diodes, while those logical circuits the inputs of which constitute the inputs of the computer are constituted by resistors.

19. A computer as claimed in claim 11, wherein a third winding is arranged on said second magnetic circuit means, one end of said third winding being connected to ground, a diode being connected with one of its terminals to the second end of said third winding, the other terminal of said last mentioned diode constituting a second output of the computer, said other terminal of said last mentioned diode being additionally connected with a third source of impulses of the same polarity as those of said second source of second electric impulses and synchronized therewith.

20. A computer as claimed in claim 19, wherein said second and third windings on said second magnetic circuit means are wound in identical winding directions.

References Cited by the Examiner

UNITED STATES PATENTS

| | | | |
|---|---|---|---|
| 2,853,632 | 9/58 | Gray | 307—88.5 |
| 2,914,751 | 11/59 | Steagall | 340—174 |
| 2,961,745 | 11/60 | Smith | 29—155.5 |
| 2,976,519 | 3/61 | Smith | 307—88 |
| 2,976,519 | 3/61 | Smith | 340—174 |
| 2,985,948 | 5/61 | Peters | 29—155.5 |

OTHER REFERENCES

Pages 36 to 44, 1957, "Digital Computer Components and Circuits," by R. K. Richards, Van Nostrand Co.

IRVING L. SRAGOW, *Primary Examiner.*

EVERETT R. REYNOLDS, *Examiner.*

UNITED STATES PATENT OFFICE
CERTIFICATE OF CORRECTION

Patent No. 3,204,111

August 31, 1965

Claude Chemla et al.

It is hereby certified that error appears in the above numbered patent requiring correction and that the said Letters Patent should read as corrected below.

In the heading to the printed specification, line 8, for "Dec. 29, 1958" read -- Dec. 31, 1958 --.

Signed and sealed this 14th day of June 1966.

(SEAL)
Attest:

ERNEST W. SWIDER
Attesting Officer

EDWARD J. BRENNER
Commissioner of Patents